US008721084B2

(12) United States Patent
Mori (10) Patent No.: US 8,721,084 B2
(45) Date of Patent: May 13, 2014

(54) IN-VEHICLE SPOTLIGHT PROJECTING APPARATUS FOR SWITCH OPERATION GUIDANCE TO VEHICLE OCCUPANT

(75) Inventor: Kenichi Mori, Suzuka (JP)

(73) Assignee: Denso Corporation, Kariya, Aichi-Pref. (JP)

(*) Notice: Subject to any disclaimer, the term of this patent is extended or adjusted under 35 U.S.C. 154(b) by 703 days.

(21) Appl. No.: 12/149,146

(22) Filed: Apr. 28, 2008

(65) Prior Publication Data

US 2008/0297727 A1 Dec. 4, 2008

(30) Foreign Application Priority Data

May 29, 2007 (JP) ................. 2007-141476

(51) Int. Cl.
*G03B 21/00* (2006.01)
(52) U.S. Cl.
USPC ............................................. 353/14; 353/13
(58) Field of Classification Search
USPC ................... 353/11, 12, 13, 14, 42, 121, 122;
348/601; 701/2, 211, 36
See application file for complete search history.

(56) References Cited

U.S. PATENT DOCUMENTS

| 7,131,728 | B2 * | 11/2006 | Nambudiri et al. ............ 353/13 |
| 7,225,060 | B2 * | 5/2007 | O'Connor et al. ............ 701/1 |
| 7,275,831 | B2 | 10/2007 | Knoll et al. | |
| 7,489,303 | B1 * | 2/2009 | Pryor ........................... 345/173 |
| 2002/0140545 | A1 * | 10/2002 | Nietupski et al. ............ 340/5.72 |
| 2004/0148091 | A1 * | 7/2004 | Masclet et al. ............... 701/200 |
| 2005/0039191 | A1 * | 2/2005 | Hewson et al. ............... 719/317 |
| 2005/0055154 | A1 * | 3/2005 | Tanaka et al. ................ 701/200 |
| 2005/0065711 | A1 * | 3/2005 | Dahlgren et al. ............. 701/117 |
| 2005/0116818 | A1 * | 6/2005 | Kennedy et al. .............. 340/500 |
| 2006/0142902 | A1 * | 6/2006 | Hohl et al. ......................... 701/1 |

FOREIGN PATENT DOCUMENTS

| DE | 103 34 720 | 3/2005 |
| JP | 9-210716 | 8/1997 |
| JP | 2001-198353 | 7/2001 |
| JP | 2003-165404 | 6/2003 |
| JP | 2004-262363 | 9/2004 |
| JP | 2005-289096 | 10/2005 |
| WO | PCT/JP2007/074637 | 12/2007 |
| WO | WO 2008/087832 | 7/2008 |

OTHER PUBLICATIONS

Japanese office action dated Jan. 11, 2011, re JP 2007-141476 (including English translation).
U.S. Appl. No. 12/071,212, filed Feb. 19, 2008.
U.S. Appl. No. 12/055,710, filed Mar. 26, 2008.
U.S. Appl. No. 12/055,736, filed Mar. 26, 2008.

* cited by examiner

*Primary Examiner* — Francis M Legasse, Jr.
*Assistant Examiner* — Bao-Luan Le
(74) *Attorney, Agent, or Firm* — Nixon & Vanderhye PC

(57) ABSTRACT

An apparatus includes a laser projector and a laser beam ECU that is connected to a vehicle communication apparatus for communicating with an information center that provides a guidance service by an operator. According to an operation guidance by the operator, information indicating a switch to be operated is sent from the information center to the laser beam ECU through the vehicle communication apparatus. Then, the laser beam ECU identifies the switch to be operated based on the information and controls the laser projector to direct a laser beam to the switch to be operated.

13 Claims, 4 Drawing Sheets

| | SW | X, Y |
|---|---|---|
| A/C | AUTO ... ... | |
| NAVI | DESTINATION MENU OK ... ... | |

# IN-VEHICLE SPOTLIGHT PROJECTING APPARATUS FOR SWITCH OPERATION GUIDANCE TO VEHICLE OCCUPANT

CROSS REFERENCE TO RELATED APPLICATION

The present application is based on and claims the benefit of priority of Japanese Patent Application No. 2007-141476 filed on May 29, 2007, the disclosure of which is incorporated herein by reference.

FIELD OF THE INVENTION

The present disclosure generally relates to a spotlight projecting apparatus for use in a vehicle.

BACKGROUND INFORMATION

Conventionally, a laser light emission apparatus on a traveling vehicle is used to project a laser beam for displaying instruction information such as a direction-pointing instruction, a turning point instruction or the like on a road surface by scanning the laser beam perpendicularly to a traveling direction of the vehicle. Such apparatus is disclosed in, for example, Japanese patent document JP-A-H09-210716. By using such apparatus, a driver of the vehicle can recognize the instruction information such as the direction-pointing instruction, the turning point instruction or the like without moving a looking direction to an inside of the vehicle.

However, the inside of the vehicle is filled with many apparatuses and devices such as a navigation apparatus, an audio apparatus, and an air-conditioning apparatus as well as many operation switches on an instrument panel and the like. Further, the operation methods of those apparatuses are becoming more and more complicated. Therefore, an operator guidance service by "Telematics" through communication with an information center is provided for guiding a user in the vehicle with the voice guidance of the operator to achieve the desired operation of those apparatuses. However, the voice guidance by the operator is not always sufficient for clearly indicating the operation method of the apparatus.

In addition, the apparatus in the above-identified patent document cannot provide a display instruction for clarifying the operation method of many operation switches in the inside of the vehicle.

SUMMARY OF THE INVENTION

The present invention provides a technique that clearly explains an operation method of a vehicle apparatus or the like.

The spotlight projecting apparatus of the present invention includes: a device for projecting a visible light to a spot or to an area, and a unit to control a direction of the visible light to an operation switch to be operated by an occupant of a vehicle.

The spotlight projector having the above configuration directs the visible light to the operation switch to be operated by the occupant of the vehicle for clearly indicating which is a subject switch of, for example, vocally provided explanation among plural switches, thereby improving the ease of an explanation of an operation method of the relevant switch. The operation switch to be operated may include a push button switch, a toggle switch, a rotary switch, a touch switch, a proximity switch and the like.

BRIEF DESCRIPTION OF THE DRAWINGS

Other objects, features and advantages of the present invention will become more apparent from the following detailed description made with reference to the accompanying drawings, in which.

DETAILED DESCRIPTION

First Embodiment

Figure 1:
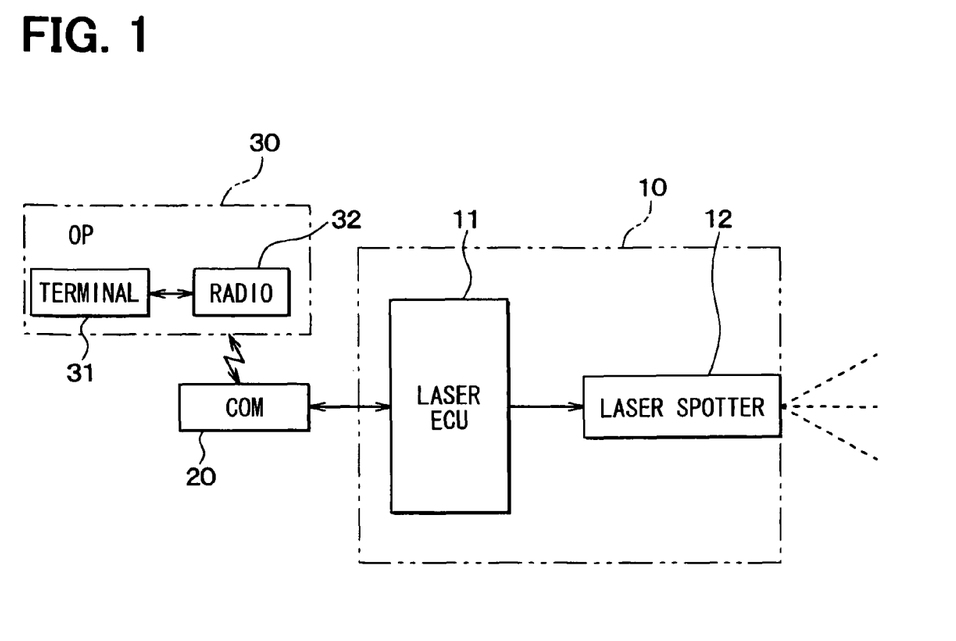
FIG. 1 shows a block diagram of a vehicle light irradiation display machine, an in-vehicle communicator, and a terminal of an information center in a first embodiment of the present invention.

A vehicle light irradiation display machine, an in-vehicle communicator and a terminal of an information center, as a whole configuration, in the first embodiment of the present invention are shown in FIG. 1. The vehicle light irradiation display machine consists of a laser beam spotter 10 comprising a laser beam ECU 11 and a laser projector 12. In addition, the laser beam spotter 10 is installed in an in-vehicle communicator 20 that is connected to the laser beam ECU 11.

As for the in-vehicle communicator 20, it is implemented as a telematics terminal in communication with the information center 30 for a guidance service from an operator. "Telematics" is, in this case, the general term of a system which integrally organizes a GPS network, a radio vehicular telephony network, and/or an Internet for offering various services.

A terminal 31 connected to a radio 32 is installed in the information center 30. The operator of the information center 30 operates the terminal 31 for offering various guidance services.

Figure 2:
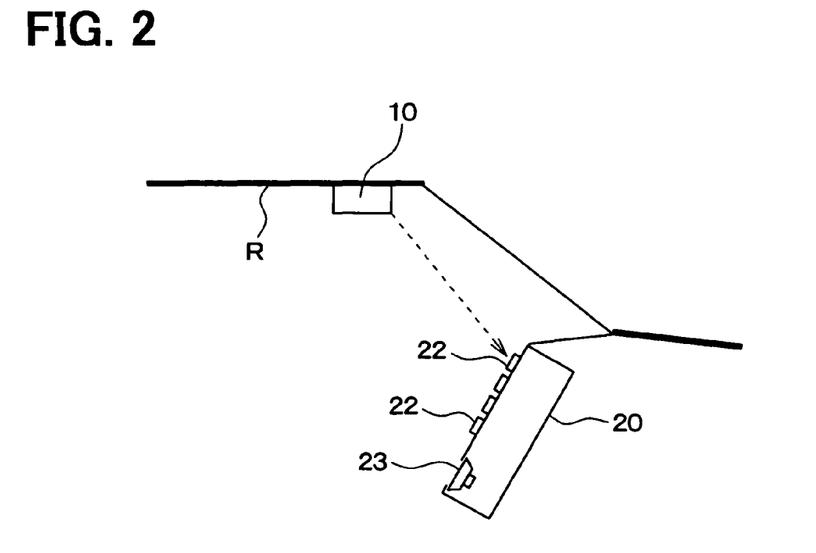
FIG. 2 shows a side view illustration of installation positions of a laser beam spotter and the in-vehicle communicator.

The laser beam spotter 10 is installed on a ceiling R of the vehicle between a driver's seat and a passenger's seat as shown in FIG. 2, and the in-vehicle communicator 20 is installed in an instrument panel of the vehicle.

The laser beam ECU 11 consists of the computer which has a CPU, a memory, and an I/O, and the CPU executes various processes according to the program memorized in the memory.

The laser projector 12 projects towards an inside of the vehicle a visible light from a laser diode that serves as the light emitting element for performing point indication and area indication. The point indication and the area indication may be known as pointing by using a laser pointer.

The laser projector 12 has a driving mechanism (not illustrated) for variably moving a laser pointing position in two mutually-perpendicular directions (i.e., X, Y axes) according to a signal input by the laser beam ECU 11, and pointing position of the laser beam for the point indication can be changed the driving mechanism.

Figure 3:
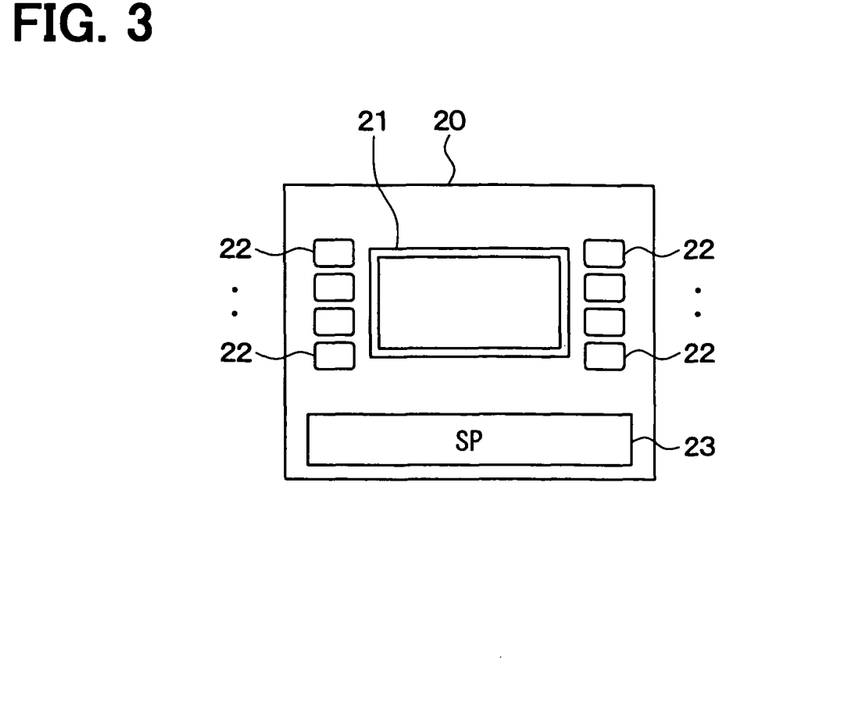
FIG. 3 shows a front view of a front panel of the in-vehicle communicator in a compartment of a vehicle.

An operation switch 22 for various operations and a speaker 23 for voice output are provided on a front panel of the in-vehicle communicator 20.

The laser beam spotter 10 in the present embodiment irradiates a specific operation switch with the laser beam among various operation switches of the vehicle air-conditioner and the in-vehicle communicator 20 in the installment panel of the vehicle for guiding the operation switch which should be operated by the occupant.

As the operation switches of the vehicle air conditioner, there are an automatic mode switch to switch between an automatic mode and a manual mode, an air intake mode switch to switch a recirculation mode and an outer air mode, an air outlet selection switch to select an air outlet, and temperature configuration switches to set a desired temperature in the vehicle compartment.

In addition, as the operation switch of the in-vehicle communicator 20, there are a destination configuration switch to set a destination, a menu switch to display a menu screen, a decision switch to instruct a decision of various operations, and a connection switch to connect to the information center 30.

The appearance of the front panel of the in-vehicle communicator 20 in the compartment is shown in FIG. 3. On the front panel of the in-vehicle communicator 20, a display screen 21 for displaying various kinds of information is installed besides the operation switch 22 and the speaker 23 for voice output as shown in FIG. 2.

In addition, the in-vehicle communicator 20 has a communication module to communicate with the information center 30 and a microphone which collects occupant's voice (none of those illustrated).

The in-vehicle communicator 20 in the present embodiment has a destination set-up function to set a destination depending upon receiving the operation of the occupant, a course finding function to find the most suitable guidance course toward the destination from the departure place and to display the course on a map, a course guidance function to provide guidance according to the course, an interactive function to talk to the operator of the information center 30 through the speaker 23 and the like besides the speaker itself.

Figure 4:
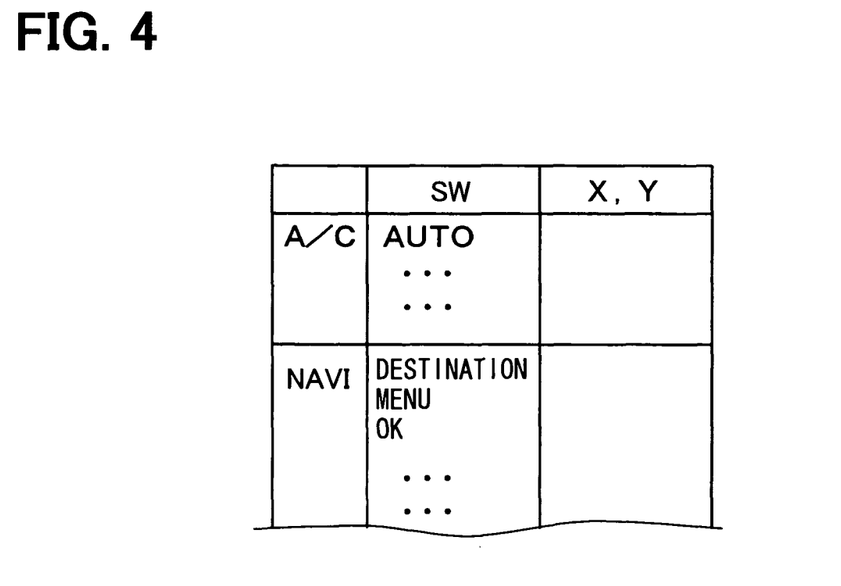
FIG. 4 shows a diagram of a map that defines laser projection coordinates of the laser beam spotter.

In a memory of the laser beam ECU 11, the map that defines a projection coordinate (X,Y) of the laser projector 12 for each operation switch in the compartment as shown in FIG. 4 is memorized. In addition, a map suitable for a vehicle model and the grade of the vehicle is memorized in the memory of the laser beam ECU 11 because positions and the kinds of the operation switches are different depending on the model and the grade of the vehicle.

When a signal to represent an operation to the operation switch by the occupant from the vehicle air conditioner or the in-vehicle communicator 20 is input into the laser beam ECU 11, the projection coordinate (X, Y) of the operation switch to be spotted is identified by referring to the map, and a signal which orders the projection of the laser beam is output to the laser projector 12.

In addition, a signal to represent an operation by the occupant from the vehicle air conditioner and the in-vehicle communicator 20 to the operation switch having the laser beam projected thereto is input to the laser beam ECU 11.

The laser beam ECU 11 determines that the operation switch having the laser beam projected thereto is operated based on the signal representing the operation to the operation switch by the occupant so that the projection of the laser beam is stopped.

The occupant operates the in-vehicle communicator 20 to inquire about operation of a desired switch from the operator of the information center 30, and such is explained in the following.

When the occupant pushes down a connection switch on the in-vehicle communicator 20, a signal for line connection is sent out from the in-vehicle communicator 20 to the terminal 31 of the information center 30. Then, conversation between the occupant and the operator of the information center 30 is enabled when communication between the in-vehicle communicator 20 and the terminal 31 is established. In addition, when communication with the information center 30 is established, vehicle information such as vehicle identification information, a vehicle model, and the grade of the vehicle registered in the memory of the in-vehicle communicator 20 beforehand is transmitted to the terminal 31 of the information center 30, and the transmitted information is displayed on a display unit of the terminal 31. The operator recognizes the vehicle model and the grade of the vehicle by viewing the display unit, and can grasp positions and the like of the operation switch of the vehicle air conditioner or the in-vehicle communicator 20.

Then, the occupant tells an operation which he/she would like to be explained to the operator, the operator operates the terminal 31 to select the operation switch to be operated, and each operation is explained. For example, when the operation of "the destination configuration switch" is explained, the operator operates the terminal 31, and selects "the destination configuration switch," and a sound guide to "push the destination configuration switch" is provided. Then, speech information of the operation guidance is transmitted from the terminal 31 to the in-vehicle communicator 20, and the code which shows the operation switch to be operated in accordance with the operation guidance is transmitted from the terminal 31 to the laser beam ECU 11 through the in-vehicle communicator 20. In addition, the code is transmitted as packet data.

The laser beam ECU 11 performs a process to project the laser beam from the laser projector 12 to the operation switch to be operated based on the code to represent the operation switch to be operated.

Figure 5:
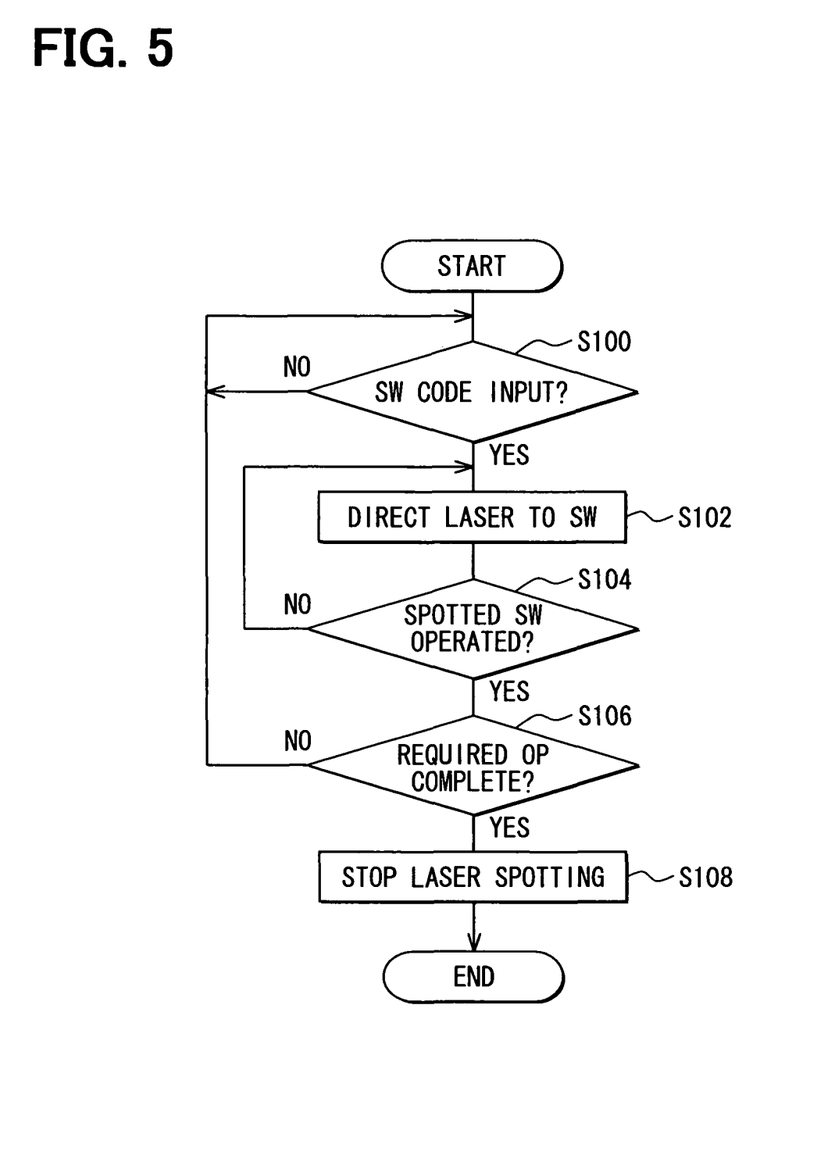
FIG. 5 shows a flowchart of a process in a laser beam ECU.

According to FIG. 5, processing of the laser beam ECU 11 is explained next. When communication between the in-vehicle communicator 20 and the information center 30 is established as mentioned above, the laser beam ECU 11 performs processing as shown in FIG. 5.

At first, it determines whether the code showing the operation switch to be operated from the terminal 31 is input through the in-vehicle communicator 20 (S100).

When the code showing the operation switch to be operated is not input, a determination of S100 is repeated.

In addition, the determination in S100 becomes YES to instruct the projection of the laser beam to an operation switch being selected (S102) when the code showing the operation switch to be operated is input. More practically, an operation switch to have the laser beam is identified from the received code, and the projection coordinate (X, Y) of the operation switch is also identified with reference to the map stored in the memory. Then, a signal instructing the projection of the laser beam to the projection coordinate is output to the laser projector 12.

The projection of the laser beam to the selected operation switch from the laser projector 12 is started by the signal. For example, "a destination configuration switch" is indicated by the point indication of the laser beam in synchronization with the operation explanation of "a destination configuration switch."

Then, whether the occupant has pushed down the operation switch is determined (S104). More practically, whether the operation switch having the laser beam projected is operated is determined based on a signal input from the vehicle air conditioner or the in-vehicle communicator 20 having the operation switch with the laser beam pointed thereto.

When the operation switch having the laser beam is not pushed down, the determination of S104 becomes NO, and a determination process of S104 is repeated. In other words, the projection of the laser beam to the operation switch is continued.

Then, the determination of S104 becomes YES when the operation switch having the laser beam is pushed down, and whether a required operation has completed is determined (S106). More practically, whether the required operation is complete is determined based on an input of a signal that indicates the completion of the required operation into the laser beam ECU 11. In this case, the input of the signal is determined with the operation of the terminal 31 by the operator of the information center 30.

When the signal indicating that the required operation is complete is not input, processing returns to S100 for repeating the above procedure.

For example, when the operation explanation by the operator of the information center 30 is switched to the explanation of "the menu switch," the point indication is switched to "the menu switch" in synchronization with the explanation of "the menu switch."

Then, upon having the operation of the terminal 31 by the operator of the information center 30, the signal which indicates that the required operation is complete is input through the in-vehicle communicator 20 from the terminal 31, and the determination in S106 becomes YES, which triggers an output of a signal that instructs a stop of the projection of the laser beam to the operation switch (S108). More practically, a signal ordering a stop of the projection of the laser beam is output to the laser projector 12, and the processing is finished. Upon having the signal, the laser projector 12 stops the projection of the laser beam.

Because the visible light is irradiated in a pointing manner on the operation switch which the occupant should operate according to the above configuration, the occupant can recognize the position of the operation switch intuitively, and the operation method can be explained more easily. As the operation switch, a push button switch, a toggle switch, a rotary switch, a touch switch, a proximity switch and other types of switches are included.

In addition, information on the operation switch to be operated is input to the laser beam ECU 11 from the information center 30 through the in-vehicle communicator 20 in synchronization with the operation guidance of the operator, and an operation switch to have the laser beam projected thereto is identified based on the information on the operation switch to be operated, the operation switch is pointed by the laser beam in synchronization with the operation guidance of the operator.

In addition, though the laser projector 12 is explained as a device that irradiates a compartment in the vehicle with the visible light from a laser diode serving as the light emitting element for the point indication, the compartment in the vehicle is irradiated locally with the visible light from the laser diode serving as the light emitting element for the area indication. In this manner, the area indication that forms a small circle, a small mark or the like, that is, a certain size of an area covered by the circle or the mark, is performed besides the spot indication that points to one point.

Second Embodiment

Figure 6:
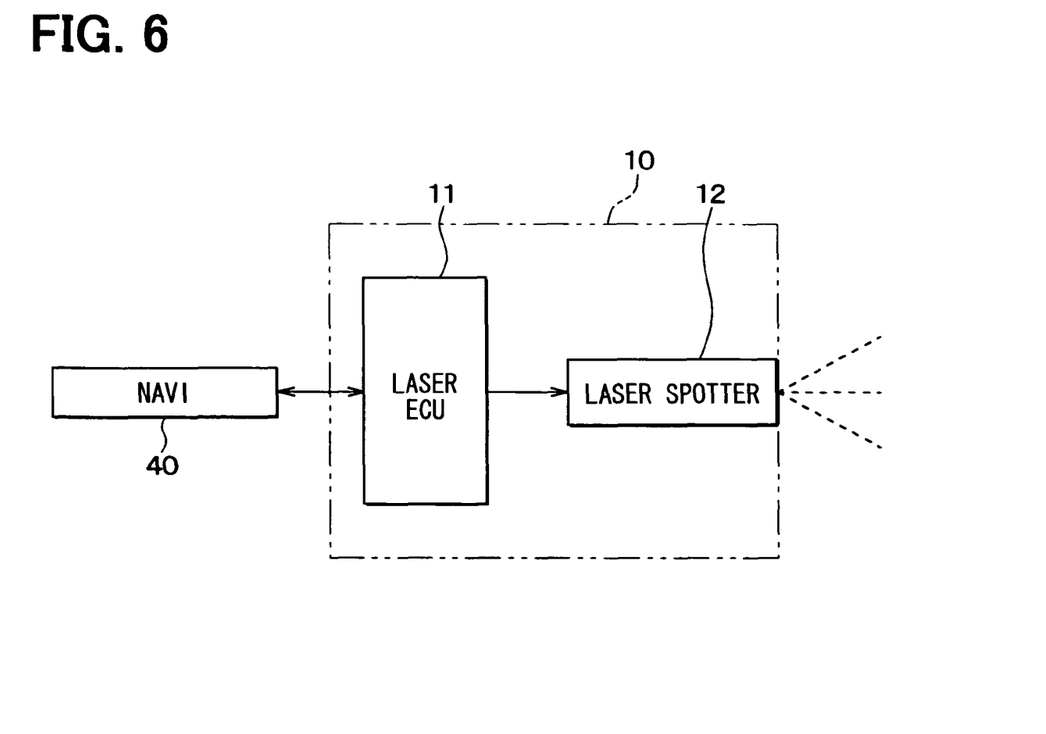
FIG. 6 shows a block diagram of a vehicle light irradiation display machine and a navigation apparatus in a second embodiment of the present invention.

The vehicle light irradiation display machine in the second embodiment of the present invention as a total configuration of the navigation apparatus is shown in FIG. 6. The vehicle light irradiation display machine includes the laser beam spotter 10, in connection to the navigation apparatus 40, having the laser beam ECU 11 and the laser projector 12. In addition, the navigation apparatus 40 and the laser beam ECU 11 are connected through an in-vehicle LAN. The same number is provided for the same part as the above embodiment in the following and explanation of the same part is omitted. Thus, the description is provided only for the different point.

Figure 7:
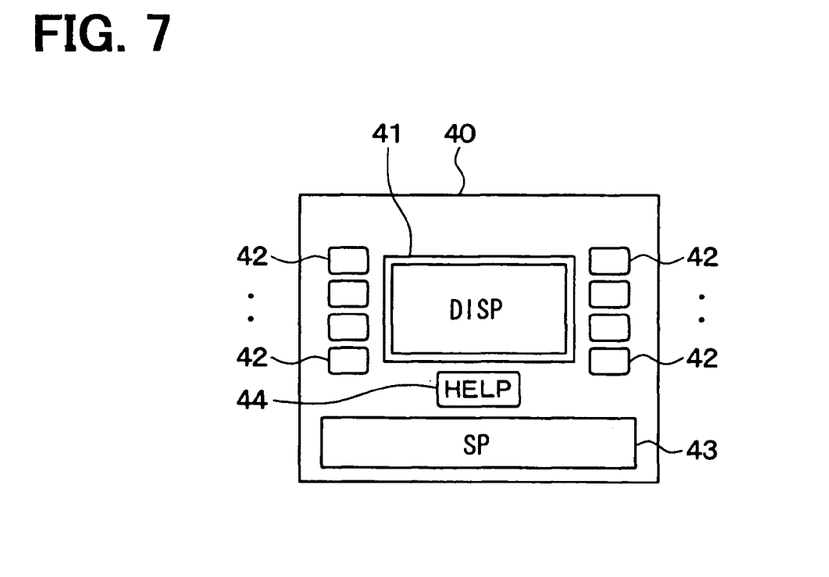
FIG. 7 shows a front view of a front panel of the navigation apparatus in a compartment of the vehicle.

The appearance of the front panel of the navigation apparatus 40 in the vehicle is shown in FIG. 7. On the front panel of the apparatus 40, a display screen 41 displaying various kinds of information, an operation switch 42 for operation, a speaker 43 for the voice output and a help button 44 to carry out a help function for guiding operation instruction are disposed on the front panel of the navigation apparatus 40.

The navigation apparatus 40 in the present embodiment has the following functions, that is, a map display function, a destination setting function, a course search function, a course guidance function, a help function and the like. The map display function detects a position of the vehicle, and a position of the vehicle is displayed on the map by the function. The destination setting function sets the destination of travel according to the operation of the occupant. The course search function searches an optimum course from a start point to the destination, and displays the course on the map. The course guidance function provides course guidance along the searched course. The help function provides operation method guidance.

The operation switch 42 has various switches, such as a destination set switch to set a destination, a menu switch to display a menu screen, a decision switch to instruct a decision of various operations and the like.

The navigation apparatus 40 in the present embodiment displays a help screen according to an operation of pushing down the help button 44 by the occupant, and starts an explanation of a selected operation with an output, to the laser beam ECU 11, of a code that shows an operation switch to be operated in accordance with the explanation when the occupant selects a certain operation in the help screen.

In addition, the laser beam ECU 11 receives an input of a signal showing an operation, by the occupant, to the operation switch of the vehicle air conditioner or the navigation apparatus 40, that is, the operation switch having the laser beam to be pointed thereto.

The laser beam ECU 11 determines, based on a signal showing an operation to the operation switch by the occupant, whether the occupant has operated the operation switch that is pointed by the laser beam.

The laser beam ECU 11 in the present embodiment performs the same processing as FIG. 5 of the first embodiment based on an input of the code which shows the operation switch to be operated in synchronization with the guidance of the operation method by the help function of the navigation apparatus 40 for performing a control to project the laser beam from the laser projector 12 toward the operation switch to be operated.

Because information to show the operation switch to be operated is input from the navigation apparatus 40 in synchronization with the guidance of the operation method by the operation explanation function according to the configuration mentioned above, and the operation switch to have the laser beam projected thereto is identified based on the information, projection of the laser beam to the operation switch which is intended to be operated is enabled in synchronization with the guidance of the operation method.

Other Embodiments

In the first embodiment described above, a specific operation switch, among various operation switches of the vehicle air conditioner and the in-vehicle communicator 20 installed in an instrument panel of the vehicle, is irradiated by the laser beam, and an operation guidance of which switch should be operated by the occupant is provided. However, for example, operation switches disposed on the audio unit, the ETC units and various switches on the instrument panel may be irradiated by the laser beam.

In addition, though memorizing a map of defining the projection coordinate (X, Y) of the laser projector 12 in the memory in advance is shown in the above embodiment, a change and/or an addition of the map may be included in the operation scheme. For example, a setting operation unit to add/change the map which defines the projection coordinate (X, Y) of the laser projector 12 may be provided on the laser beam spotter 10, and the setting operation unit may be operated to add/change the projection coordinate (X, Y) of the laser projector 12.

In addition, though the laser projector 12 is installed on the ceiling R of the vehicle and an operation switch on the vehicle air conditioner, the in-vehicle communicator 20, and navigation apparatus 40 is pointed by the laser beam from the laser projector 12 in the above embodiments, the switches such as a fuel lid opening switch, a trunk room opening switch or the like may also be pointed by the laser beam from the laser projector 12 that is installed at a position that enables the laser beam pointing of those switches.

Further, though the code which shows the operation switch to be operated is input into the laser projector 12 through the in-vehicle communicator 20 from the information center 30 in synchronization with the operation guidance of the operator in the above embodiment, a switch name, a projection coordinate of the switch to be operated or the like may be, for example, input to the laser projector 12 instead of the code showing the operation switch to be operated.

Furthermore, though an example of communicating with the terminal 31 of the information center 30 through the in-vehicle communicator 20 that serves as the telematics terminal is shown in the above embodiment, the in-vehicle communicator 20 may be a device that is different from the telematics terminal.

Furthermore, though an example of implementing the light emitting element by using the laser diode is shown in the above embodiments, the light emitting element may be implemented by using a different device from the laser diode.

Such changes and modifications are to be understood as being within the scope of the present invention as defined by the appended claims.

What is claimed is:

1. A spotlight projector comprising:
a light projection device capable of projecting a visible light emitted from a light emission element to indicate one of a point and an area; and
a light controller capable of selectively illuminating one of a plurality of operational switches predisposed on a front panel of a vehicle so as to guide an occupant of the vehicle towards actuation of that particular operational switch,
wherein
the light controller identifies a visible light projection position of the one of the plurality of operation switches which is to be operated,
the light projection device projects, by changing a direction of the visible light, the visible light towards the visible light projection position of the one of the plurality of operation switches identified by the light controller,
the light controller has a communication unit connected thereto for having communication with an information center that provides a guidance service by an operator,
the light controller receives switch information that indicates an operation switch to be operated in synchronization with an operation guidance by the operator from the information center through the communication unit,
the light controller identifies, based on the switch information from the information center, the operation switch that has the visible light directed thereto, and
the light projection device projects the visible light towards the operation switch to be operated as identified by the light controller.

2. The spotlight projector of claim 1, wherein the light emission element is implemented as a laser diode.

3. The spotlight projector of claim 1, wherein
a map defining the visible light projection position of each of the plurality of the operation switches is stored in a memory of the light controller, and
the light controller identifies the visible light projection position of each of the plurality of operation switches with reference to the map.

4. The spotlight projector of claim 1, wherein
the area indicated by the visible light from the light projection device has at least one of a circle shape and a mark having a predetermined area size.

5. The spotlight projector of claim 1, wherein
the projection of the visible light is stopped when the operation switch having the visible light projected thereto is determined to be operated.

6. A spotlight projector comprising:
a light projection device capable of projecting a visible light emitted from a light emission element to indicate one of a point and an area;
a light controller capable of selectively illuminating one of a plurality of operational switches predisposed on a front panel of a vehicle so as to guide an occupant of the vehicle towards actuation of that particular operational switch; and
an information device capable of providing an operation guidance function that guides an operation method,
wherein
the light controller identifies a visible light projection position of the one of the plurality of operation switches which is to be operated,
the light projection device projects, by changing a direction of the visible light,
the visible light towards the visible light projection position of the one of the plurality of operation switches identified by the light controller,
switch information is provided by the information device in synchronization with the guidance of the operation method of the operation guidance function,
the light controller identifies the operation switch that has the visible light directed thereto based on the switch information for indicating the operation switch to be operated provided by the information device, and the light projection device projects the visible light towards the operation switch identified by the light controller.

7. An in-vehicle spotlight projection system for providing operational guidance to a vehicle occupant, said system comprising:

a light projection device capable of projecting a light beam along a controllable path;

a projection controller connected to control the path of said light beam within a vehicle to selectively illuminate one of a plurality of operational switches predisposed on a front panel of a vehicle and thereby visibly guide a vehicle occupant to take future action at that particular operational switch in response to the then current controlled light beam path position; and a communication device configured to establish a communication link between said projection controller and a remote information center whereby light beam path position is controlled by a remote guidance operator to be synchronized with guidance operator instructions to the vehicle occupant regarding said future action.

8. The in-vehicle spotlight projection system as in claim 7, wherein said light beam is generated by a laser diode.

9. An in-vehicle spotlight projection system for providing operational guidance to a vehicle occupant, said system comprising:

a light projection device capable of projecting a light beam along a controllable path;

a projection controller connected to control the path of said light beam within a vehicle to selectively illuminate one of a plurality of operational switches predisposed on a front panel of a vehicle and thereby visibly guide a vehicle occupant to take future action at that particular operational switch in response to the then current controlled light beam path position;

an in-vehicle guidance device capable of providing operational guidance as to its own operational control; and a communication device configured to establish a communication link between said projection controller and said in-vehicle guidance device whereby light beam path position is controlled by said in-vehicle guidance device to be synchronized with guidance instruction also issued by the in-vehicle guidance device to the vehicle occupant regarding said future action.

10. A spotlight projector comprising:

a light projection device capable of projecting a visible light emitted from a light emission element to indicate one of a point and an area; and a light controller capable of selectively illuminating one of a plurality of operational switches predisposed on a front panel of a vehicle so as to guide an occupant of the vehicle towards actuation of that particular operational switch;

wherein the light controller identifies a visible light projection position of the one of the plurality of operation switches which is to be operated, the light projection device projects, by changing a direction of the visible light, the visible light towards the visible light projection position of the one of the plurality of operation switches identified by the light controller, the light controller has a communication unit connected thereto for having communication with an information center to receive a code, the code indicating an operation switch to be operated, the light controller identifies, based on the code from the information center, the operation switch that has the visible light directed thereto as the operation switch indicated in the code, and the light projection device projects the visible light towards the operation switch to be operated as identified by the light controller.

11. A spotlight projector comprising:

a light projection device capable of projecting a visible light emitted from a light emission element to indicate one of a point and an area;

a light controller capable of selectively illuminating one of a plurality of operational switches predisposed on a front panel of a vehicle so as to guide an occupant of the vehicle towards actuation of that particular operational switch; and wherein the light controller identifies a visible light projection position of the one of the plurality of operation switches which is to be operated, the light projection device projects, by changing a direction of the visible light, the visible light towards the visible light projection position of the one of the plurality of operation switches identified by the light controller, the light controller has a communication unit connected thereto to communicate with an information center that provides voice guidance by an operator, the light controller receives, based on an operation indicative of selecting an operation switch, a code that indicates the operation switch from the information center through the communication unit, and the light controller identifies, based on the code that indicates the operation switch to be operated, the operation switch that has the visible light directed thereto, and the light projection device projects the visible light towards the operation switch to be operated as identified by the light controller.

12. A spotlight projector comprising:

a light projection device capable of projecting a visible tight emitted from a light emission element to indicate one of a point and an area;

a light controller capable of selectively illuminating one of a plurality of operational switches predisposed on a front panel of a vehicle so as to guide an occupant of the vehicle towards actuation of that particular operational switch; and an in-vehicle information device capable of providing an operation guidance function for guiding an operation method and a code indicating an operation switch to be operated in synchronization with the operation guidance function, wherein the light controller identifies a visible light projection position of the one of the plurality of operation switches which is to be operated, the light projection device projects, by changing a direction of the visible light, the visible light towards the visible light projection position of the one of the plurality of operation switches identified by the light controller, the light controller identifies the operation switch that has visible light directed thereto based on the code from the in-vehicle information device, and the light projection device projects visible light towards the operation switch to be operated as identified by the light controller.

13. A spotlight projector comprising:

a light projection device capable of projecting a visible light emitted from a light emission element to indicate one of a point and an area;

a light controller capable of selectively illuminating one of a plurality of operational switches predisposed on a front panel of a vehicle so as to guide an occupant of the vehicle towards actuation of that particular operational switch; and an in-vehicle information device capable of providing operational guidance for guiding an operation, wherein the light controller identifies a visible light projection position of the one of the plurality of operation switches which is to be operated, the light projection device projects, by changing a direction of the visible light, the visible light towards the visible tight projection position of the one of the plurality of operation switches identified by the light controller, when a vehicle occupant selects an operation having operational guidance, the in-vehicle information device provides the operation guidance of the selected operation, and outputs to the light controller a code indicative of an operation switch that is to be operated, the light controller identifies the operation switch that has visible light directed thereto based on the code from the in-vehicle information device, and the light projection device projects visible light towards the operation switch to be operated as identified by the light controller.

* * * * *